United States Patent
Liu et al.

(10) Patent No.: US 11,033,888 B2
(45) Date of Patent: Jun. 15, 2021

(54) NANOFIBER ELECTROCATALYST

(71) Applicant: UCHICAGO ARGONNE, LLC, Chicago, IL (US)

(72) Inventors: Di-Jia Liu, Elmhurst, IL (US); Lina Chong, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 65 days.

(21) Appl. No.: 16/116,662

(22) Filed: Aug. 29, 2018

(65) Prior Publication Data
US 2019/0060888 A1 Feb. 28, 2019

Related U.S. Application Data

(60) Provisional application No. 62/552,340, filed on Aug. 30, 2017.

(51) Int. Cl.
*B01J 35/00* (2006.01)
*B01J 35/06* (2006.01)
(Continued)

(52) U.S. Cl.
CPC ......... *B01J 31/1691* (2013.01); *B01J 21/185* (2013.01); *B01J 23/10* (2013.01);
(Continued)

(58) Field of Classification Search
CPC ...... B01J 31/1691; B01J 21/185; B01J 23/10; B01J 23/20; B01J 23/28; B01J 23/34; B01J 23/745; B01J 23/75; B01J 23/83; B01J 23/8871; B01J 27/24; B01J 35/002; B01J 35/0033; B01J 35/06; B01J 35/1014; B01J 35/1019; B01J 35/1023; B01J 35/1057;
(Continued)

(56) References Cited

U.S. PATENT DOCUMENTS 550,223 A 11/1895 Griscom
7,507,690 B2 3/2009 Krumpelt et al.
(Continued)

FOREIGN PATENT DOCUMENTS

| CN | 10 2962036 | * 3/2013 | ............. B01D 53/02 |
| CN | 10-5854853 | * 8/2016 | ............. B01J 20/26 |

(Continued)

OTHER PUBLICATIONS

Jing Tan et al., "Construction of hierarchical trimetallic organic framework leaf-like nanostructures derived from carbon nanotubes for gas-sensing applications." Journal of Hazardous Materials 400, pp. 1-9. (Year: 2020).*
(Continued)

*Primary Examiner* — Patricia L. Hailey
(74) *Attorney, Agent, or Firm* — Foley & Lardner LLP

(57) ABSTRACT

A nanofibrous catalyst for in the electrolyzer and methods of making the catalyst. The catalysts are composed of highly porous transition metal carbonitrides, metal oxides or perovskites derived from the metal-organic frameworks and integrated into a 3D porous nano-network electrode architecture. The catalysts are low-cost, highly active toward OER, with excellent conductivity yet resistant to the oxidation under high potential operable under both acidic and alkaline environments.

12 Claims, 7 Drawing Sheets

(51) Int. Cl.
| | |
|---|---|
| B01J 23/745 | (2006.01) |
| B82Y 40/00 | (2011.01) |
| B82Y 30/00 | (2011.01) |
| C08L 77/06 | (2006.01) |
| B01J 31/18 | (2006.01) |
| B01J 31/16 | (2006.01) |
| B01J 35/10 | (2006.01) |
| C08L 23/08 | (2006.01) |
| C08L 33/12 | (2006.01) |
| C08L 33/20 | (2006.01) |
| C08L 39/06 | (2006.01) |
| C08L 75/04 | (2006.01) |
| C08L 77/00 | (2006.01) |
| B01J 37/34 | (2006.01) |
| B01J 37/08 | (2006.01) |
| B01J 23/34 | (2006.01) |
| B01J 21/18 | (2006.01) |
| B01J 23/20 | (2006.01) |
| B01J 37/04 | (2006.01) |
| B01J 23/28 | (2006.01) |
| B01J 23/75 | (2006.01) |
| B01J 23/10 | (2006.01) |
| B01J 27/24 | (2006.01) |
| B01J 23/83 | (2006.01) |
| B01J 23/887 | (2006.01) |

(52) U.S. Cl.
CPC ............... *B01J 23/20* (2013.01); *B01J 23/28* (2013.01); *B01J 23/34* (2013.01); *B01J 23/745* (2013.01); *B01J 23/75* (2013.01); *B01J 23/83* (2013.01); *B01J 23/8871* (2013.01); *B01J 27/24* (2013.01); *B01J 35/002* (2013.01); *B01J 35/0033* (2013.01); *B01J 35/06* (2013.01); *B01J 35/1014* (2013.01); *B01J 35/1019* (2013.01); *B01J 35/1023* (2013.01); *B01J 35/1057* (2013.01); *B01J 35/1061* (2013.01); *B01J 37/04* (2013.01); *B01J 37/084* (2013.01); *B01J 37/348* (2013.01); *C08L 23/0853* (2013.01); *C08L 33/12* (2013.01); *C08L 33/20* (2013.01); *C08L 39/06* (2013.01); *C08L 75/04* (2013.01); *C08L 77/00* (2013.01); *B01J 31/181* (2013.01); *B01J 2531/11* (2013.01); *B01J 2531/36* (2013.01); *B01J 2531/37* (2013.01); *B01J 2531/38* (2013.01); *B01J 2531/48* (2013.01); *B01J 2531/57* (2013.01); *B01J 2531/58* (2013.01); *B01J 2531/64* (2013.01); *B01J 2531/66* (2013.01); *B01J 2531/72* (2013.01); *B01J 2531/842* (2013.01); *B01J 2531/845* (2013.01); *B01J 2531/847* (2013.01); *B82Y 30/00* (2013.01); *B82Y 40/00* (2013.01); *C08L 77/06* (2013.01)

(58) Field of Classification Search
CPC ...... B01J 35/1061; B01J 37/04; B01J 37/084; B01J 37/349; B01J 31/181; B01J 2531/11; B01J 2531/36; B01J 2531/37; B01J 2531/38; B01J 2531/57; B01J 2531/2531; B01J 2531/58; B01J 2531/64; B01J 2531/66; B01J 2531/72; B01J 2531/842; B01J 2531/845; B01J 2531/847; C08L 23/0853; C08L 33/12; C08L 33/20; C08L 39/06; C08L 75/04; C08L 77/00; C08L 77/06; B01Y 30/00; B01Y 40/00

USPC ........................................................ 502/300
See application file for complete search history.

(56) References Cited

U.S. PATENT DOCUMENTS

| | | | |
|---|---|---|---|
| 7,550,223 B2 | 6/2009 | Zelenay et al. | |
| 8,821,776 B2 * | 9/2014 | Caballero Lopez | D01F 1/10 264/211 |
| 8,835,343 B2 | 9/2014 | Liu et al. | |
| 9,012,344 B2 | 4/2015 | Liu et al. | |
| 9,180,443 B1 | 11/2015 | Serov et al. | |
| 9,350,026 B2 | 5/2016 | Liu et al. | |
| 9,825,308 B1 | 11/2017 | Liu et al. | |
| 2003/0145681 A1 | 8/2003 | El-Shall et al. | |
| 2003/0228972 A1 | 12/2003 | Birss et al. | |
| 2004/0204315 A1 | 10/2004 | Krumpelt et al. | |
| 2008/0286490 A1 | 11/2008 | Bogdanoff et al. | |
| 2009/0023828 A1 | 1/2009 | Yu et al. | |
| 2009/0183996 A1 | 7/2009 | Richter et al. | |
| 2010/0043636 A1 | 2/2010 | Hwang et al. | |
| 2010/0285100 A1 * | 11/2010 | Balkus, Jr. | C01G 23/047 424/445 |
| 2011/0124500 A1 | 5/2011 | Fang et al. | |
| 2011/0137025 A1 | 6/2011 | Yaghi et al. | |
| 2011/0143913 A1 | 6/2011 | Yang et al. | |
| 2011/0144365 A1 | 6/2011 | Park et al. | |
| 2011/0294658 A1 | 12/2011 | Lefevre et al. | |
| 2012/0046164 A1 | 2/2012 | Tanaka et al. | |
| 2012/0077667 A1 | 3/2012 | Liu et al. | |
| 2014/0093790 A1 * | 4/2014 | Liu | H01M 8/0263 429/405 |
| 2014/0099571 A1 | 4/2014 | Proietti et al. | |
| 2015/0180045 A1 | 6/2015 | Liu et al. | |
| 2015/0231622 A1 | 8/2015 | Kitagawa et al. | |
| 2015/0295248 A1 | 10/2015 | Serov et al. | |
| 2015/0340705 A1 | 11/2015 | Tylus et al. | |
| 2015/0380741 A1 | 12/2015 | Serov et al. | |
| 2016/0012927 A1 | 1/2016 | Nenoff et al. | |
| 2016/0211529 A1 | 7/2016 | Kurungot et al. | |
| 2016/0231233 A1 | 8/2016 | Wang et al. | |
| 2016/0248102 A1 | 8/2016 | Liu et al. | |
| 2017/0012277 A1 | 1/2017 | Wang | |
| 2017/0145599 A1 * | 5/2017 | Mu | D01F 1/10 |
| 2019/0060888 A1 | 2/2019 | Liu et al. | |

FOREIGN PATENT DOCUMENTS

| | | | | |
|---|---|---|---|---|
| CN | 10 5854853 | * | 8/2016 | ............ B01J 20/26 |
| CN | 10-6835362 | * | 6/2017 | |
| CN | 10 6865362 | * | 6/2017 | ............ D01F 1/10 |
| CN | 10 7442125 | * | 12/2017 | ............ B01J 23/75 |
| CN | 10 9126885 | * | 1/2019 | ............ B01J 31/28 |
| CN | 11 1477886 | * | 7/2020 | ............ H01M 4/88 |
| WO | WO-2007/007113 A2 | | 1/2007 | |
| WO | WO-2010/051619 A1 | | 5/2010 | |
| WO | WO-2015/077039 A1 | | 5/2015 | |
| WO | WO-2015/173553 A1 | | 11/2015 | |
| WO | WO-2016/000032 A1 | | 1/2016 | |

OTHER PUBLICATIONS

Duraisamy Senthil Raja et al., "Composition-balanced trimetallic MOFs as ultra-efficient electrocatalysts for oxygen evolution reaction at high current densities." Applied Catalysis B: Environmental 279, pp. 1-14. (Year: 2020).*

Zijun Liang et al., "Non-noble trimetallic Cu—Ni—Co nanoparticles supported on metal-organic frameworks as highly efficient catalysts for hydrolysis of ammonia borane." Journal of Alloys and Compounds 741, pp. 501-508. (Year: 2018).*

Hongxu Chen et al., "Bimetallic metal-organic framework-derived carbon nanocubes as efficient electrocatalysts for oxygen evolution reaction." Journal of Solid State Chemistry 291, pp. 1-6. (Year: 2020).*

(56) References Cited

OTHER PUBLICATIONS

Carmo, et al., "A comprehensive review on PEM water electrolysis," International Journal of Hydrogen Energy 38(12), pp. 4901-4934 (2013).
Chong, et al., "Investigation of Oxygen Reduction Activity of Catalysts Derived from Co and Co/Zn Methyl-Imidazolate Frameworks in Proton Exchange Membrane Fuel Cells," ChemElectroChem 3(10), pp. 1541-1545 (2016).
Faubert, et al., "Activation and Characterization of Fe-based Catalysts for the Reduction of Oxygen in Polymer Electrolyte Fuel Cells," Electrochimica Acta 43(14-15), pp. 1969-1984 (1998).
Janiak, et al., "MOFs, MILs and more: concepts, properties and applications for porous coordination networks (PCNs)", New Journal of Chemistry 34(11), pp. 2337-2388 (2010).
Jaouen, et al., "Cross-Laboratory Experimental Study of Non-Noble-Metal Electrocatalysts for the Oxygen Reduction Reaction," ACS Applied Materials & Interfaces 1(8), pp. 1623-1639 (2009).
Jasinski, "A New Fuel Cell Cathode Catalyst", Nature 201, pp. 1212-1213 (1986).
Lefevre, et al., "Fe-based Catalysts for the Reduction of Oxygen in Polymer Electrolyte Membrane Fuel Cell Conditions: Determination of the Amount of Peroxide Released During Electroreduction and its Influence on the Stability of the Catalysts," Electrochimica Acta 28, pp. 2749-2760 (2003).
Lefevre, et al., "Iron-Based Catalysts with Improved Oxygen Reduction Activity in Polymer Electrolyte Fuel Cells," Science 324, pp. 71-74 (2009).
Ma, et al., "Cobalt Imidazolate Framework as Precursor for Oxygen Reduction Reaction Electrocatalysts," Chemistry: A European Journal 17(7), pp. 2063-2067 (2011).
Ma, et al., "Coboly Imidazolate Framework as Precursor for Oxygen Reduction Reaction Electrocatalyst," Chemistry: A European Journal 17(7), pp. 2063-2067 (2011).
Ma, et al., "Framework-Catenation Isomerism in Metal-Organic Frameworks and Its Impact on Hydrogen Uptake," Journal of the American Chemistry Society 129, pp. 1858-1859 (2007).
Proietti et al., "Iron-based cathode catalyst with enhanced power density in polymer electrolyte membrane fuel cells", Nature Communications 2, 416, 9 pages (2011).
Van Veen, "Oxygen Reduction on Monomeric Transition Metal Phthalocyanines in Acid Electrolyte," Electrochimica Acta 21, pp. 921-928 (1979).
Wu, et al., "Polyaniline-Derived Non-Precious Catalyst for the Polymer Electrolyte Fuel Cell Cathode," ECS Transactions 16(2), pp. 159-170 (2008).
Zhao, et al., "Highly Efficient Non-Precious Metal Electrocatalysts Prepared from One-Pot Synthesized Zeolitic Imidazolate Frameworks," Advanced Materials 26(7), pp. 1093-1097 (2014).
Zhao, et al., "Iron imidazolate framework as precursor for electrocatalysts in polymer electrolyte membrane fuel cells," Chemical Science 3, pp. 3200-3205 (2012).
Alia, et al., "Activity and Durability of Iridium Nanoparticles in the Oxygen Evolution Reaction", Journal of the Electrochemical Society, 163(11), pp. F3105-F3112 (2016).
Bernt & Gasteiger, "Influence of Ionomer Content in IrO2/TiO2 Electrodes on PEM Water Electrolyzer Performance," Journal of the Electrochemical Society 163(11), pp. F3179-F3189 (2016).
Hahn, et al., "Engineering Cu surfaces for the electrocatalytic conversion of CO2: Controlling selectivity toward oxygenates and hydrocarbons," Proceedings of the National Academy of Sciences 114(23), pp. 5918-5923 (2017).
Hwang, et al., "Perovskites in catalysis and electrocatalysis," Science 358(6364), pp. 751-756 (2017).
Wang, et al., "Improving the activity and stability of Ir catalysts for PEM electrolyzer anodes by SnO2:Sb aerogel supports: does V addition play an active role in electrocatalysis?," Journal of Materials Chemistry A 5(7), pp. 3172-3178 (2017).
Back, et al., "Single-atom catalysts for CO2 electroreduction with significant activity and selectivity improvements," Chemical Science 8(2), pp. 1090-1096 (2017).

Bard & Faulkner, "Electromechanical Methods: Fundamentals and Applications," John Wiley & Sons, Inc. (2011).
Barkholtz, et al., "Enhanced performance of non-PGM catalysts in air operated PEM-fuel cells," International Journal of Hydrogen Energy 41(47), pp. 22598-22604 (2016).
Gao, et al., "Atomic layer confined vacancies for atomic-level insights into carbon dioxide electroreduction," Nature Communications 8, 14503, 9 pages (2017).
Huan, et al., "Electrochemical Reduction of CO2 Catalyzed by Fe—N—C Materials: a Structure-Selectivity Study," ACS Catalysis, 7, pp. 1520-1525 (2017).
Huo, et al., "A versatile, industrially relevant, aqueous room temperature synthesis of HKUST-1 with high space-time yield," J. Mater. Chem. A, 1, pp. 15220-15223 (2013).
Keskin, et al., "Atomically detailed models of gas mixture diffusion through CuBTC membranes," Microporous and Mesoporous Materials 125(1-2), pp. 101-106 (2009).
Kornienko, et al., "Metal-Organic Frameworks for Electrocatalytic Reduction of Carbon Dioxide," J. Am. Chem. Soc., 137, pp. 14129-14135 (2015).
Kumar, et al., "Highly selective electrochemical reduction of carbon dioxide using Cu based metal organic framework as an electrocatalyst," Electrochemistry Communications, 25, pp. 70-73 (2012).
Kumar, et al., "New trends in the development of heterogeneous catalysts for electrochemical CO2 reduction," Catalysis Today 270, pp. 19-30 (2016).
Lee, et al., "Sustainable production of formic acid by electrolytic reduction of gaseous carbon dioxide," Journal of Materials Chemistry A 3(6), pp. 3029-3034 (2015).
Lux, et al., "Heat-treatment of metal-organic frameworks for green energy applications," CrystEngComm 17, pp. 10-22 (2015).
Nie, et al., "Selectivity of CO2 Reduction on Copper Electrodes: The Role of the Kinetics of Elementary Steps," Angewandte Chemie 52(9), pp. 2459-2462 (2013).
Rungtaweevoranit, et al., "Copper Nanocrystals Encapsulated in Zr-based Metal-Organic Frameworks for Highly Selective CO2 Hydrogenation to Methanol," Nano Letters 16(12), pp. 7645-7649 (2016).
Serov, et al., "Templated bi-metallic non-PGM catalysts for oxygen reduction," Electrochimica Acta 80, pp. 213-218 (2012).
Serov, et al., "Tri-metallic transition metal-nitrogen-carbon catalysts derived by sacrificial support method synthesis," Electrochimica Acta 109, pp. 433-439 (2013).
Studt, et al., "Discovery of a Ni—Ga catalyst for carbon dioxide reduction to methanol," Nature Chemistry 6, pp. 320-324 (2014).
Sun, et al., "Catalytic Hydrolysis of Ammonia Borane via Cobalt Palladium Nanoparticles," ACS Nano 5(8), pp. 6458-6464 (2011).
U.S. Notice of Allowance on U.S. Appl. No. 15/203,083 dated Jul. 19, 2017.
Yi et al., "Hollow metallic microspheres: Fabrication and Characterization," The Journal of Physical Chemistry C 113(4), pp. 1222-1226 (2009).
Zhang, et al., "Honeycomb-like mesoporous nitrogen-doped carbon supported Pt catalyst for methanol electrooxidation," Carbon 93, pp. 1050-1058 (2015).
Huynh, et al., "A Functionally Stable Manganese Oxide Oxygen Evolution Catalyst in Acid," Journal of the American Chemical Society 136(16), pp. 6002-6010 (2014).
Ayers, et al., "Perspectives on Low-Temperature Electrolysis and Potential for Renewable Hydrogen at Scale," Annual Review of Chemical and Biomolecular Engineering 10, pp. 219-239 (2019).
Chatti, et al., "Intrinsically stable in situ generated electrocatalyst for long-term oxidation of acidic water at up to 80 C," Nature Catalysis 2, pp. 457-465 (2019).
Danilovic, et al., "Using Surface Segregation to Design Stable Ru—Ir Oxides for the Oxygen Evolution Reaction in Acidic Environments," Angewandte Chemie 126(51), pp. 14240-14245 (2014).
Dresselhaus & Thomas, "Alternative energy technologies," Nature 414, pp. 332-337 (2001).
Gray, "Powering the planet with solar fuel," Nature Chemistry 1, p. 7 (2009).

(56) References Cited

OTHER PUBLICATIONS

Hu, et al., "IrO2/Nb—TiO2 electrocatalyst for oxygen evolution reaction in acidic medium," International Journal of Hydrogen Energy 39(13), pp. 6967-69796 (2014).

Indra, et al., "Unification of Catalytic Water Oxidation and Oxygen Reduction Reactions: Amorphous Beat Crystalline Cobalt Iron Oxides," Journal of the American Chemical Society 136(50), pp. 17530-17536 (2014).

Kanan & Nocera, "In Situ Formation of an Oxygen-Evolving Catalyst in Neutral Water Containing Phosphate and Co2 ," Science 321(5892), pp. 1072-1075 (2008).

Katsounaros, et al., "Oxygen Electrochemistry as a Cornerstone for Sustainable Energy Conversion," Angewandte Chemie 53(1), pp. 102-121 (2014).

Kwon, et al., "Cobalt Assisted Synthesis of IrCu Hollow Octahedral Nanocages as Highly Active Electrocatalysts toward Oxygen Evolution Reaction," Advanced Functional Materials 27(7), 1604688, 8 pages (2017).

McCrory, et al., "Benchmarking Hydrogen Evolving Reaction and Oxygen Evolving Reaction Electrocatalysts for Solar Water Splitting Devices," Journal of the American Chemical Society 137(13), pp. 4347-4357 (2015).

Mondschein, et al., "Crystalline Cobalt Oxide Films for Sustained Electrocatalytic Oxygen Evolution under Strongly Acidic Conditions," Chemistry of Materials 29(3), pp. 950-957 (2017).

Moreno-Hernandez, et al., "Crystalline nickel manganese antimonate as a stable water-oxidation catalyst in aqueous 1.0 M H2SO4," Energy & Environmental Science 10(10), pp. 2103-2108 (2017).

Nong, et al., "A unique oxygen ligand environment facilitates water oxidation in hole-doped IrNiOx core-shell electrocatalysts," Nature Catalysis 1, pp. 841-851 (2018).

Oh, et al., "Oxide-supported Ir nanodendrites with high activity and durability for the oxygen evolution reaction in acid PEM water electrolyzers," Chemical Science 6(6), pp. 3321-3328 (2015).

Oh, et al., "Preparation of Mesoporous Sb-, F-, and In-Doped SnO2 Bulk Powder with High Surface Area for Use as Catalyst Supports in Electrolytic Cells," Advanced Functional Materials 25(7), pp. 1074-1081 (2015).

Park, et al., "Iridium-Based Multimetallic Nanoframe@Nanoframe Structure: An Efficient and Robust Electrocatalyst toward Oxygen Evolution Reaction," ACS Nano 11(6), pp. 5500-5509 (2017).

Pei, et al., "Synthesis and catalysis of chemically reduced metal-metalloid amorphous alloys," Chemical Society Reviews 41(24), pp. 8140-8162 (2012).

Reier, et al., "Electrocatalytic Oxygen Evolution Reaction in Acidic Environments—Reaction Mechanisms and Catalysts," Advanced Energy Materials 7(1), 1601275, 18 pages (2017).

Sardar, et al., "Water-Splitting Electrocatalysis in Acid Conditions Using Ruthenate-Iridate Pyrochlore," Angewandte Chemie 126(41), pp. 11140-11144 (2014).

Seitz, et al., "A highly active and stable IrOx/SrIrO3 catalyst for the oxygen evolution reaction," Science 353(6303), pp. 1011-1014 (2016).

Shan, et al., "Charge-Redistribution-Enhanced Nanocrystalline Ru@IrOx Electrocatalysts for Oxygen Evolution in Acidic Media," Chem 5(2), pp. 445-459 (2019).

Smith, et al., "Photochemical Route for Accessing Amorphous Metal Oxide Materials for Water Oxidation Catalysis," Science 340(6128), pp. 60-63 (2013).

Suen, et al., "Electrocatalysis for the oxygen evolution reaction: recent development and future perspectives," Chemical Society Reviews 46(2), pp. 337-365 (2017).

Yue, et al., "Template-Free Synthesis of Hierarchical Porous Metal-Organic Frameworks," Journal of the American Chemical Society 135(26), pp. 9572-9575 (2013).

\* cited by examiner

NANOFIBER ELECTROCATALYST

CROSS-REFERENCE TO RELATED APPLICATIONS

This application claims priority to and the benefit of U.S. Provisional Patent Application No. 62/552,340, filed on Aug. 30, 2017, the content of which is fully incorporated by reference herein in its entirety.

GOVERNMENT SUPPORT CLAUSE

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to methods for nanofibrous materials; specific embodiments relate to metal organic framework nanofibrous catalytic materials.

BACKGROUND

Low temperature water electrolysis represents one of the critical technologies in distributed hydrogen production. It produces clean hydrogen with fast response time and works perfectly when coupled with renewable but intermittent power sources, such as wind and solar. Low temperature electrolysis can be operated by using either proton exchange or alkaline membranes. The low temperature membrane electrolyzers offer advantages of higher current density and higher $H_2$ purity, rendering them a preferred technology when high energy efficiency and low footprint are essential (see "A comprehensive review on PEM water electrolysis," Marcelo Carmo, et al., International Journal of Hydrogen Energy, 38, 4901(2013)).

Water electrolyzer can operate using either alkaline or acidic membranes. For alkaline electrolyzer, the electrochemical reactions anode and cathode are the following:

Anode: $2OH^- \rightarrow \frac{1}{2}O_2 + H_2O + 2e^-$ (1)

Cathode: $2H_2O + 2e^- \rightarrow H_2 + 2OH^-$ (2)

For acidic or proton exchange membrane electrolyzer, the electrochemical reactions anode and cathode are the following:

Anode: $H_2O \rightarrow 2H^+ + \frac{1}{2}O_2 + 2e^-$ (3)

Cathode: $2H^+ + 2e^- \rightarrow H_2$ (4)

Working in the oxidative environment under high polarization voltage, however, adds substantial demand to the electrode catalyst and the support. This is particularly the case at anode where the oxygen evolution reaction (OER) takes place. At present, the platinum group metal (PGM) materials such as iridium black are catalysts of choice. Their high cost and limited reserve, however, limit the broad implementation of polymer electrolyzer in the renewable energy landscape. Low-cost transition metal oxides known to be active toward OER in alkaline electrolyte are unstable in acid. Furthermore, traditional catalyst support such as porous carbon cannot sustain the oxidative potential before being oxidized to $CO_2$.

At present, the OER catalyst for low temperature electrolyzer faces two major challenges. First is the cost. The preferred catalysts for OER in low temperature electrolyzer include PGM materials such as Ir black, $RuO_2$, etc. These metals are expensive with the natural reserves even less than that of Pt. With the anticipated increase of its usage in water electrolyzer, the iridium price will become highly unpredictable. The conventional transition metal oxides ($NiO_x$, $MnO_x$, ...) or perovskites ($LaNiO_3$, $LaCoO_3$, ...) used in the alkaline electrolyzer cannot be applied in PEM electrolyzer since they are dissolvable in the acidic environment. Furthermore, they are generally not sufficiently conductive which impede the electrolyzer efficiency. The second is the catalyst support stability. Ideally, the catalyst should be dispersed over high surface support to improve its usage. For better operating efficiency under high current density, it is essential that the catalyst support causes the lowest possible impedance-induced overpotential. Conventional carbon black (CB) as the catalyst support has excellent conductivity but cannot be used in low temperature electrolyzer. CB is composed of nanosized carbon particles, characterized by a weakly aligned, highly defective turbostratic surface. The electrical conduction is achieved through electron percolation between individual CB particles. Under the OER potential, the carbon particles will shrink by oxidation which interrupts such percolation, leading to increased electrode impedance and eventual shutdown of catalysis. Alternatives to carbon have been evaluated for PEM electrolyzer, most notably a selected group of acid-tolerant metal oxides, such as $TiO_2$, $SnO_2$, $Ta_2O_5$, etc. The electric conductivities of these oxides, however, are significantly less than that of carbon, rendering them inefficient in the PEM electrolyzer application. Thus, there remains an unmet need for high-efficiency and durable PGM-free OER catalysts.

SUMMARY

Embodiments described herein relate generally to a nanofibrous catalyst for in the electrolyzer. The new catalysts are composed of highly porous transition metal carbonitrides or metal oxides derived from the metal-organic frameworks and integrated into a 3D porous nano-network electrode architecture. They are prepared using earthly abundant materials and have the unique macropore-to-micropore morphology which are particularly important when condensable water is used as the reactant. The new catalysts are low-cost and highly active toward OER with excellent conductivity yet resistant to the oxidation under high potential operable under both acidic and alkaline environments.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
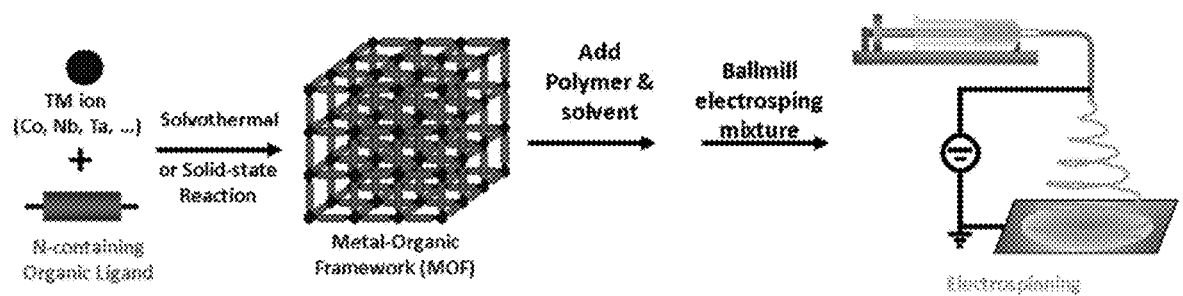
FIG. 1 shows schematics of synthesis of nanofiber embedded with metal-organic-framework (MOF) nanocrystallites by electrospinning of mixture containing MOF nanocrystallites suspended in polymer slurry.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to an electrolyzer for water splitting in hydrogen production. U.S. Pat. No. 9,350,026 and U.S. Pat. App. Pub. No. 2016/0248102, a divisional thereof, describe certain nanofibrous catalysts and the contents of both are hereby incorporated by reference.

One embodiment relates to a new class of PGM-free OER catalyst for low temperature electrolyzer application. The catalysts have a high specific surface area (100 to 1000 m$^2$/gram). The new catalysts have the composition of highly porous yet highly stable transition metal (TM) carbonitrides, in which the metals are bonded by nitrogen embedded in high surface carbide, or in the form of porous metal oxide, in which atomically dispersed carbon atoms are doped inside of the metal oxide. Such OER catalysts are synthesized either from the monometallic, bimetallic and trimetallic MOFs containing transition metals (such as cobalt, iron, manganese, zirconium, molybdenum, tantalum tungsten yttrium and niobium) and lanthanide (such as lanthanum, cerium, gadolinium, etc.) as the metal center or "secondary building units" (SBUs) coordinated by nitrogen containing or carboxylic ligands; or by infiltrating soluble transition metal or lanthanide compounds into such MOFs. Furthermore, in one embodiment, the MOFs are integrated into a nanofibrous network form through electrospin method before a thermal activation to be converted to catalysts. Thus formed catalysts have porous, interconnected nano-network electrode architecture which can further improve the conductivity, mass transport and durability against oxidative corrosion while embedded MOFs maintain morphology similar to the crystal form before the activation under selected conversion condition. The activity and durability of the new catalysts are evaluated by the RDE method in both alkaline and acidic electrolytes.

One embodiment relates to TM carbonitrides having the general formula $TM_x/N_y/C_z$, that are synthesized from MOF-based precursors and are active and stable in acidic and basic OER reaction conditions for electrolyzer. Unlike carbon, metal carbide and nitride are extremely stably in acid and under oxidative condition. They are generally very hard, ceramics-like materials with metal-like conductivity but low in porosity, rendering them unsuitable for electrocatalysis. However, the TM carbonitrides as described herein differ from prior bulk produced carbonitrides. First, TM carbonitrides as described below have high surface area and porosity. Unlike conventional carbides/nitrides which are produced through reduction of bulk metals or metal oxides, embodiments described herein include TM carbonitrides, $TM_x/N_y/C_z$, prepared from MOFs.

FIG. 1 illustrates one embodiment of a process for preparing electrospin precursors as the first step to form $TM_x/N_y/C_z$, TM carbonitrides or TM oxide in a nanofibrous network. In this process, MOFs are first synthesized by coordinating the selected TM ions (SBU) with the N-containing organic linkers (organic ligands) through solvothermal reaction or solid-state synthesis. The formation of the MOF utilizes a transition metal ion The transition metal ion may be selected from the group consisting of Co, Fe, Mn, Mo, Li, Nb, Ta, Zr, Y, Nb, and other transition metals known to promote $O_2$ redox catalysis when they are bonded with nitrogen in $N_y/C_z$ composites. In their carbonitride forms, these TMs are generally considered to be positively charged. The transition metals noted above for the TM carbonitrides are metals that are also prone to form carbide/nitride under high temperature. The TM used as the SBU will form the "hub" in the MOF structure and, following thermal treatment, be converted into a metallic form and then further converted into an oxide/nitride depending on the reaction path. The TM used in the MOF to prepare catalyst results in TM oxides as described below. These TM oxides, for example, maintain hollow hexahedron MOF structure possessing amount of macropores, which facilitate the interaction between the active site and electrolyte.

During the MOF synthesis, one, two or three different transition metal ions may be used together to form monometallic, bimetallic and trimetallic MOFs in which the SBUs are the mixture of one, two or three different type of transition metals. According to one embodiment, the bimetallic and trimetallic carbonitrides offer improved OER activities over their monometallic counterparts. Alternatively, MOF can be synthesized using one kind of metal ion while the second and third metal can be added in the form of metal salt or complex in the MOF cavity encapsulated during the MOF synthesis or added through infusion after MOF synthesis as described in U.S. patent application Ser. No. 13/444,550 (incorporated herein by reference). Generally speaking, the encapsulation method is more adaptable to charge-neutral metal complex with more uniform dispersion, whereas infiltration is more suitable for the soluble salt and tends to produce more concentration at the cavities near MOF surface. The MOFs thus prepared will be mixed with a polymer solution, such as through ball-milling, to form a mixture for the electrospin process. In the MOF-polymer mixture, the MOF nanoparticles are suspended in the polymer solution. The mixture is subsequently converted to solid polymer-MOF nanofibrous mat through electrospin, as is also demonstrated by FIG. 1. The electrospin process used may be generally conventional, comprising a fiber production by use of electric force. In one embodiment, the size of the MOF structure for electrospinning should be less than 400 nm, otherwise the electrospin process may fail.

Electrospinning is a fiber production method which uses electric force to draw charged threads of polymer solutions. The polymer solution, in embodiments described herein further comprising MOFs as a mixture, is then charged by application of a voltage. Electrostatic repulsive force acts counter to the surface tension on the polymer mixture such that a droplet is stretched, thinning the droplet into an elongated form. At a critical point a stream of liquid erupts from the surface. The molecular cohesion of the polymer solution of the mixture is sufficiently high that the erupted stream remains continuous forming a thin, long jet. As the jet dries in flight, the mode of current flow changes from ohmic to convective as the charge migrates to the surface of the fiber. The jet is then elongated by a whipping process caused by electrostatic repulsion initiated at small bends in the fiber, until it is finally deposited on the grounded collector. The elongation and thinning of the fiber resulting from this bending instability leads to the formation of uniform fibers with nanometer-scale diameters. The presence of the MOF in the mixture which is electrospun, results in a uniform distribution of the MOF crystals in the resultant fiber.

Figure 10:
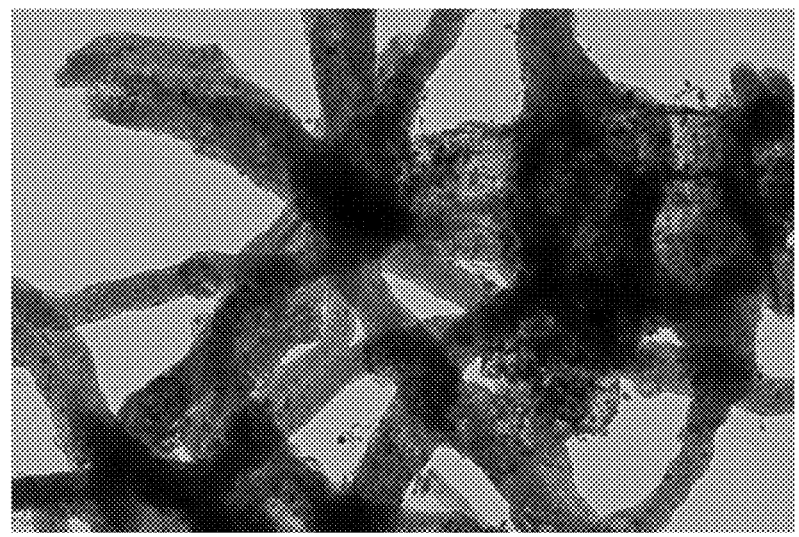
FIG. 10 shows the morphology of the PNCE catalyst prepared according to Example 2.

Once the MOF-containing nanofibers are formed, they undergo further processing for conversion into catalytic materials. In one embodiment, the resultant nanofibers under high temperature pyrolysis to be converted into nanofibrous catalysts for OER application in alkaline media, as described the Path 1 in FIG. 2. The structure of the MOF crystals is maintained following thermal treatment, with the TM oxide forming interconnected structures (such as tubes or strings around 2-3 nm in diameter) between TM oxide particles (which may be converted to nitrides as described further herein). For example, where the TM is cobalt, $Co_3O_4$ strings may connect the cobalt catalyst sites. The first step involves the pyrolysis under the temperature from 750° C. to 1100° C. from one to four hours under the flow of inert gases such as Ar or $N_2$. This high temperature pyrolysis converts the MOFs to highly stable yet porous $TM_x/N_y/C_z$ catalysts with redox activity toward oxygen. The high temperature treatment also decomposes and carbonizes the polymer component in the nanofibers, rendering the pyrolyzed nanofiber highly porous and conductive to electricity and heat. In a further embodiment, the pyrolyzed nanofibers are subjected to a second step of heat treatment under the air flow at the temperature between 200° C. to 500° C. so that a fraction of the metal is being oxidized to form porous metal oxide. Immediately following the oxidation, the airflow will be replaced by ammonia flow, which reduces the metal oxide to metal nitride-metal carbon composite, $TM_x/N_y/C_z$. The resultant composite catalytic material maintains the interconnected nanofibrous morphology, as is shown by FIG. 10. Yet, each fiber contains individual and interconnected $TM_x/N_y/C_z$ (where x, y, and z can be in various stoichiometric ratios) particle-liked composite with MOF-liked morphology, as is shown by FIG. 10. As the MOF crystals are uniformly dispersed in the fiber prior to heat treatment, the described heat treatment process for conversion to the catalytic material results in a uniform distribution of the catalytic particle-like TM nitrides.

Figure 2:
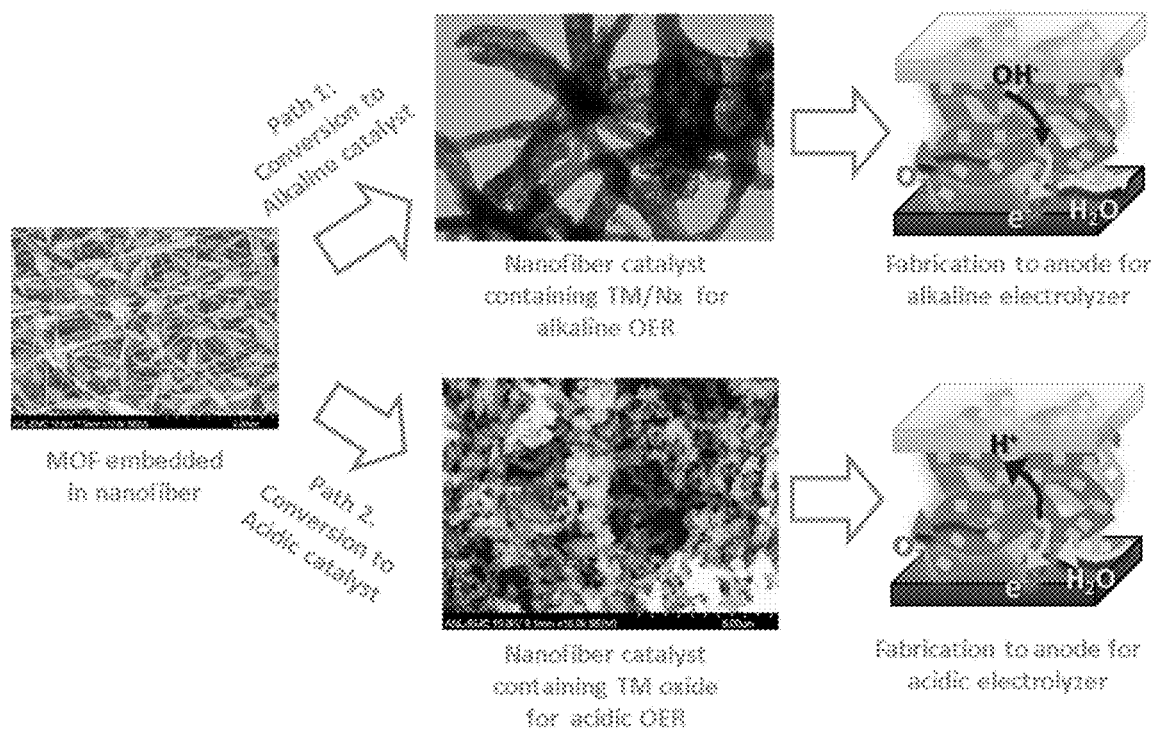
FIG. 2 shows schematics of preparing a porous nano-network catalyst electrode (PNCE) anode for alkaline electrolyzer (path 1) and acidic electrolyzer (path 2) by electrospinning MOF mixture followed by post-treatments.

Another embodiment relates to interconnected and conductive nanoporous monometallic, bimetallic and trimetallic TM oxide composites can be synthesized by incorporating the corresponding MOF-based precursors into nanofibrous form via electrospin, followed by a first thermal activation in an oxidative environment, as is described by the Path 2 in FIG. 2. During such process, the polymer in the nanofiber will be decomposed and oxidized to $CO_2$ whereas the TM in MOF embedded in the nanofiber will be oxidized, such as relatively slowly during the first thermal activation, into TM oxide in the oxidative conversion. There can be more than one oxidation state exist in TM oxides thus formed. For example, Co—ZIF embedded in nanofiber can be oxidized to a mixture of CoO and $Co_2O_3$. These porous metal oxides have unique morphologies of individual oxide particles interconnected by oxide tubes doped by atomically, uniformly, dispersed carbon derived from thermal activation of MOFs encapsulated by polymeric fibrous network. These metal oxide composites have higher specific surface area and higher electric conductivity than their bulk oxide forms. They also contain highly dispersed, oxidation-resistant carbon doping to promote conductivity that does not exist in the bulk oxide counterparts. They are also active and stable in promoting electrocatalytic OER reactions in both acidic and basic conditions. FIG. 2 Path 2 illustrates one embodiment for converting electrospun nanofiber embedded with MOF to nanofibrous metal oxide catalyst for OER application in acidic electrolyte. As the MOF crystals are uniformly dispersed in the fiber prior to heat treatment, the described heat treatment process for conversion to the catalytic material results in a uniform distribution of the catalytic particle-like TM oxides.

Figure 11:
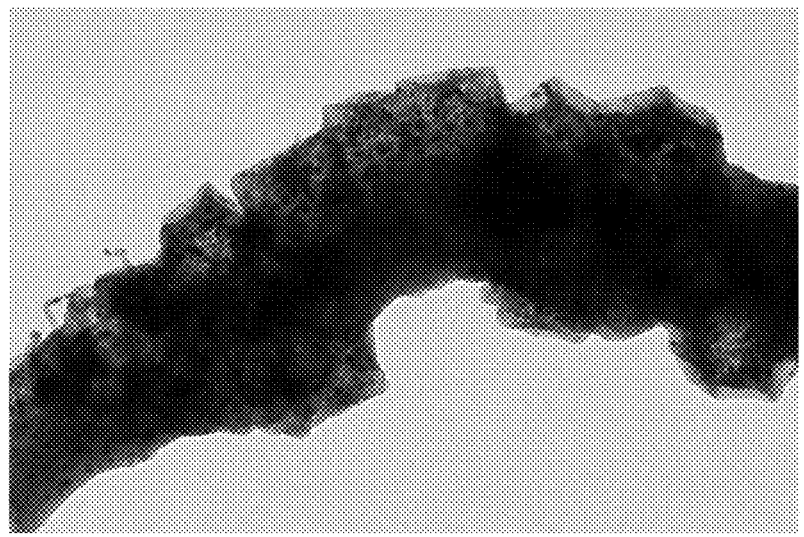
FIG. 11 shows the morphology of the PNCE catalyst prepared according to Example 4.

In certain embodiments of TM carbonitrides and the TM oxide composites, the materials have a high concentration of micropores (average pore diameter less than 2 nanometers) with more than 80% total pore volume in the micropore region. They also have PNCE morphology that improves charge and mass transfer through interconnected network. They are prepared by electro-spinning a polymer mixture containing suspended MOF microcrystallites into an interconnected polymeric fibrous network (FIG. 1), followed by high temperature pyrolysis under inert, reductive or oxidative environment. (FIG. 2) In one embodiment, the MOF's crystallites' size must be controlled so that they can be suspended in the polymeric solution mixture before the electrospin. The MOF's crystallite size can be controlled by crystallization in the dilute TM salt—ligand solution or through mechanical grinding such as planetary ball-milling, or through the combination of both. Such methods of reducing MOF's crystallite size can be generally applied to a variety of MOFs and are known to the skilled in the arts. For the formation of porous nano-network TM carbonitrides, the embedded MOFs are converted into porous nanofibrous catalysts of high surface area (750 to 1000 $m^2/g$) during pyrolysis, while the polymer matrix is either graphitized or decomposed depending on the polymer used and pyrolysis environment. The decomposition of polymer adds the formation of porosity of the nanofibers whereas graphitized carbon increase the catalyst conductivity and stability with high electro-oxidation resistance. Under high temperature first in inert (Ar, $N_2$) environment between 750 to 1100° C., then in oxidative (air) environment between 200 to 500° C., then in reducing ($NH_3$) environment between 200 to 500° C., the metal in MOFs embedded in the nanofibers MOF can react with nitrogen-containing organic ligands in the treatment under inert environment and ammonia in the treatment under reducing environment to form porous TM carbonitrides as aforementioned while the polymer fibrous network is converted to graphitic PNCE. Under the reducing gas such as ammonia, additional nitrogen atoms can be integrated into the carbonitride through the reaction with metal and carbon to further improve catalytic activity. The TM carbonitride PNCE catalyst prepared according to the current invention consists of a network of TM carbonitride particles fused together (FIG. 10) with each particle has the morphology similar to its MOF precursor (FIG. 11).

Figure 13:
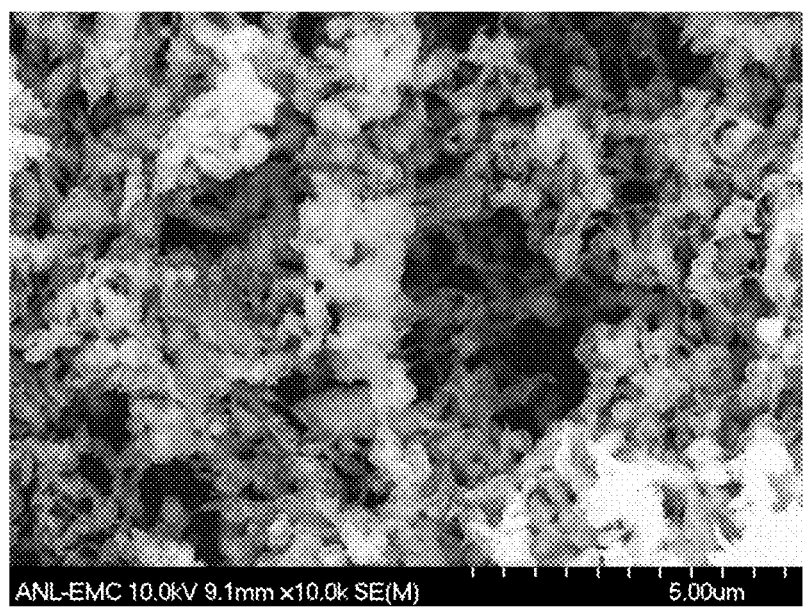
FIG. 13 shows the morphology of the PNCE catalyst prepared according to Example 9 after the thermal activation step.
Figure 14:
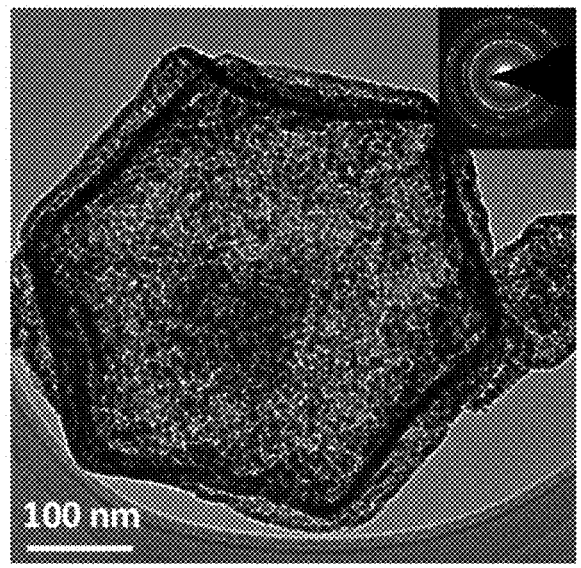
FIG. 14 shows the morphology of the PNCE catalyst prepared according to Example 9 after the thermal activation step.

For the formation of certain embodiments of porous nano-network TM oxides, the MOF embedded polymer nanofibers is converted to nanofibrous metal oxide through one-step, partial oxidation under high temperature and oxidative environment (air or oxygen containing gas). The transition metal oxide composites will be formed after partial oxidation of MOF and polymer matrix will be decomposed and oxidized, leaving the residual, atomically doped carbon as the form of coating or graphite fibers connecting individual metal oxide composite particles. The partial oxidation can be carried out at the temperature as low as 250° C. to 500° C. in air or gas mixture with low oxygen partial pressure with the duration ranging from 30 min to 10 hours depending on the combination of temperature and oxygen partial pressure. Thus formed metal oxide PNCE has an interconnected network with porous metal oxide particles connected by fiber-like metal oxide "strings" or "tubes" (FIG. 13). The porous metal oxide cluster in the PNCE have the shapes resembling to its MOF precursor with inside filled by metal oxide particle in the dimensions of a few nanometers (FIG. 14). The metal oxide particles and tubes contain atomically dispersed carbon, which rendering them electrically conductive and transmits electrons uninterruptedly to the active sites distributed throughout porous fibers for electrocatalysis. The network is robust against corrosion-induced degradation since the 3D network will remain connected through the fiber cores even if the surface is being partially oxidized. The water and $O_2$ are transported to/from the active sites readily through void between the fibers with less resistance than the powdered catalyst, improving catalyst utilization and reducing mass-transport overpotential, leading to better electrolysis efficiency.

There have been number of technical papers exploring applying metal oxide for water splitting applications. However, these prior attempts are mainly for an alkaline electrolyze.

Embodiments of an electrospun PNCE electrocatalyst described herein are fundamentally different from the prior research into water splitting materials. Certain embodiments described herein provide at least the following advantages: a) the OER catalysts derived from the MOF-based nanofibers exist high surface area and uniformly distributed catalytic sites, thus the activities are significantly improved; TM carbonitride and the TM oxide in PNCE prepared according to the current invention have higher specific surface areas than their counterparts prepared from bulk TM carbonitrides and the TM oxides; b) The TM carbonitride and the TM oxide particles in PNCE catalysts prepared according to the current invention retained the morphologies of the initial MOF precursors after the heat treatments after the polymer matrix was decomposed and removed; these particles are connected together by fused particle contact or through fiber-like metal oxide "strings"; c) they are prepared with earthly abundant materials therefore serving as low-cost replacement to precious metals; d) they have unique macropore-to-micropore morphology which promotes catalytic mass transport and reaction for condensable reactant water; and e) they enable the catalysts not only enhanced activities, but also excellent stability when operated in electrolyze for water splitting as the result of interconnected network, which outperform the conventional OER catalyst and those of the prior arts.

The process of preparing $M_x/N_y/C_z$-based catalysts or metal oxide catalysts, all with PNCE morphology, for water splitting includes the following steps:

Step 1. Preparing Monometallic, Bimetallic or Trimetallic MOF Based Precursors.

Approach 1a involves the preparation of monometallic MOFs of different structures and compositions using solvo-thermal method or solid-state synthesis. According to one embodiment, the transition metals used to prepare the monometallic MOF are those having catalytic activity for water splitting, including but not limited to cobalt, nickel, iron, copper, lanthanum, yttrium, manganese, tungsten, etc. Typically, the salts of these transition metals used for MOF precursor fabrication are nitrate, acetate, chloride and oxide. The examples of the transition metal salts include, but not limited to, $Co(NO_3)_2$, $Co(OAc)_2$, $Ni(NO_3)_2$, $Ni(OAc)_2$, $FeCl_2$, $Fe(OAc)_2$, FePc, $Fe(NO_3)_3$, $9H_2O$, $Li_2CO_3$, $Mn(OAc)_2$, $Y(NO_3)_3.5H_2O$, $MoCl_3$, $La(NO_3)_3.6H_2O$, $WCl_4$, etc. For solvothermal reaction, the concentration of the metal solution typical ranges from 0.1 mol/L to 1.0 mol/L, and more preferably, the concentration of the metal solution ranges from 0.3 mol/L to 0.4 mol/L. For the organic ligand solution preparation, the organic ligand is dissolved into organic solvent. In the preferred embodiment, the organic ligands according to one embodiment include the compounds containing two, three or four nitrogen atoms within the same aromatic ring, such as imidazolate, pyrazolate, tetrazolate. These nitrogen atoms can serve as the multi-dentate ligation sites to coordinate with the transition metal in forming MOFs. In embodiment, the MOF is synthesized using more than one type of organic ligand, where some of the organic ligands do not contain aromatic multidentate nitrogen but contain other functional groups capable to ligand with transition metal, such as carboxylate. The concentration of the ligand in the solution is generally determined by the stoichiometric ratio to the metal content in the solution and the final composition of the MOF materials. For example, if the final ratio of metal to ligand in the MOF structure is 1:2, then the molar concentration of the ligand in the solution should be twice of that of the metal in the final mixture after the metal and ligand solutions are mixed.

Approach 1b under Step 1 involves with the preparation of bimetallic MOFs precursors by adding the second transition metal to the MOF of the first transition metal through solvothermal synthesis or solid-state synthesis. The salt of the second transition metal will be used. Typically, the second transition metal that can form bimetallic transition metal carbonitride with the first transition metal, $TM_{1x}TM_{2x}/N_y/C_z$, is selected. Alternatively, the second transition metal that can form perovskite or mixed metal oxides with the first transition metal is selected. The examples of the second transition metal salts include, but are not limited to, $Y(NO_3)_3 \cdot 5H_2O$, $La(NO_3)_3 \cdot 6H_2O$, $WCl_4$, Manganese(II) carbonate, Lithium carbonate, etc. The synthesis of bimetallic MOF can be synergic or sequential. For the synergic synthesis, both first and second metal salts are mixed together in solution before reacting with the ligand. The amount of organic ligand needed is determined by the stoichiometric ratio of the total amount of the first and second transition metal. For sequential synthesis, the bimetallic MOF is prepared by two separate stages. In the first stage, a monometallic MOF is prepared according to the synthesis method described by Approach 1a. The MOF thus prepared is subsequently mixed with the second transition metal salt in solid state, followed by ball milling method. The second metal is thus uniformly mixed with the first transition metal MOF by partial exchanging the first transition metal in the MOF's lattice structure, or doped over the surface and inside of the cavity of first MOF microcrystallites. In a preferred embodiment, the molar ratio of the first transition metal salt to the second metal salt should be in the range of 50:50 to 95:5. In the more preferred embodiment, the said molar ratio should be in the range of 70:30 to 90:10. The organic ligand for the preparation of the bimetallic MOF should be the same as said ligands for the preparation of the monometallic MOF.

Approach 1c involves preparation of trimetallic transition metals MOF through solvothermal synthesis or solid-state synthesis. Typically, the third salt of the transition metal which is added using the similar method used to synthesis the bimetallic transition metal MOF described in Approach 1 b. In a preferred embodiment of Approach 1c, the molar ratio of the first transition metal salt to the second metal salt to the third metal salt should be in the range of 50:25:25 to 70:25:5. In the more preferred embodiment, the said molar ratio should be in the range of 70:15:15 to 85:10:5.

Step 2. Electrospin.

The monometallic, bimetallic and trimetallic MOFs produced from Step 1 will be subjected to electrospinning to be fabricated into interconnected polymeric nanofibrous network, as is shown by the schematics in FIG. 1. In such process, the MOFs will be first mixed with the short-chain carrier polymers and solvent to form a suspended MOF in polymer mixture. The short-chain carrier polymers include, but are not limited to polyacrylonitrile (PAN), poly(methylmethacrylate) (PMMA), polyvinylpyrrolidone (PVP). Nylon6,6, (PA-6,6,) Polyurethanes (PU), Polybenzimidazole (PBI), Polycarboate (PC), Polyethylene-co-vinyl acetate (PEVA). Collagen (PEO), polyacrylic acid-polypyrene methanol (PAA-PM), Polymethacrylate (PMMA), etc. The solvent for dissolving the polymer and suspending the MOF materials, but not dissolving MOFs, include, but is not limited to, methanol, ethanol, dimethylformamide (DMF). Such treatment serves the following purposes: (a) optimizing the concentration of the transition metal in the PNCE catalyst as the final product by controlling the amount of MOF over the polymer used in PNCE fabrication; The concentration for the MOF suspended with the polymers is in the range of 0.1 mg/ml-0.6 mg/ml. In a further embodiment, the range from 0.4 mg/ml to 0.6 mg/ml; the concentration of the dissolved polymer is in the range of 0.1-0.3 mg/ml. In a further embodiment, the range is from 0.1-0.2 mg/ml; (b) uniform dispersing of the transition metal in the catalyst through formation of the polymeric nanofibers with evenly distributed MOF, therefore reducing metal agglomeration during high temperature treatment in the following step; (c) increasing the microporosity within the fiber for better catalytic site exposure and macroporosity between the fibers for better reactant and product mass transport; and (d) connecting individual catalytic site with a continuous, interconnected network of the catalyst.

The electrospin of the MOF suspended slurry is accomplished by injecting the slurry at a controlled speed through a needle which has a high voltage potential over the conductive plate. The polymer mixture droplet exiting the injection needle is "pulled" into the fibrous form under the electric field before being dried and collected by the conductive plate. The electrospin of MOF-containing slurry needs to be conducted under the optimized operating parameters, including voltage, distance between the needle and collection plate, the injection speed, and viscosity of the slurry. The voltage which is applied between the injection needle and collection plate should be in the range from 6 kV to 15 kV. In a preferred embodiment, the voltage range from 9 kV to 11 kV. The flow rate should be in the range from 0.002 ml/min to 0.01 ml/min. In a preferred embodiment, the flow rate should range from 0.003 ml/min to 0.006 ml/min. Another key parameter for the electrospin is the viscosity of the slurry which is affected by the molecular weight of the carrier polymer and solvent content. In one embodiment, the molecular weight of the carrier polymer should range from 10K to 200K.

Step 3. Thermolysis.

The polymeric nanofibers containing MOFs produced according to the Step 2 will be subjected to high temperature treatment to form catalysts with PNCE morphology. Such treatment will carbonize MOF-containing polymeric fibers into $M_x/N_y/C_z$-based catalysts under inert, then oxidizing then reducing environment, or metal oxide/perovskite catalysts under oxidative environment. This treatment serves one or more of the following purposes: (a) forming $M_x/N_y/C_z$ composite by converting organic carbon and nitrogen to graphitic C and N which react with transition metal M to form active sites; (b) improving the electron conductivity of the PNCE materials by carbonize the organic ligands so that the charge can be more effectively transferred to and from the active site during the electrochemical reaction; or (c) forming perovskite or metal oxide structure with high surface area and high porosity yet with excellent electric conductivity by oxidizing the organic ligands and the transition metal in the MOF but leaving trace amount, uniformly distributed carbon inside of oxidized MOF. To accomplish purpose (a), the thermal treatment should be in inert, then oxidizing, then reducing environment. Under such environment, the polymer in nanofiber and organic ligand in MOFs decompose to be converted to graphitic structure while releasing hydrogen and low level of hydrocarbons, and meanwhile, the organic ligated metal ion will be reduced to metal. In the following step under air, the metal will be oxidized to metal oxide while a fraction of the carbon converted from polymer during pyrolysis will be oxidized to carbon dioxide. In the following step in the presence of ammonia, ammonia will react with oxygen in the metal oxide and carbon converted from MOF during the conversion process, leaving some nitrogen embedded in carbon to add the formation of carbonitride in combination with the nitrogen in the original MOF ligand. For purpose (c), the nanofibers thermally activated directly in the oxidative environment. Under such environment, the organics in polymer and MOF are converted to carbon dioxide while the remaining a fraction of carbon inside of converted MOF remains in the highly dispersed and atomically dispersed forms, evenly distributed in the thus formed oxides and perovskites, providing good electric conductivity. As demonstrated through the examples below, the PNCE catalysts according to one embodiment have a unique micropore-to-macropore morphology which enables effectively mass transport and interaction for both reactants and products, particularly when the reaction involving condensable moiety such as water.

The thermal conversion of the MOF-containing nanofibers is conducted in a controlled environment, such as a flow reactor surround by a heating element. In one embodiment, the treatment is carried out inside of a tubular reactor under a constant flow of carrier gas surrounded by temperature controlled furnace. For TM carbonitride conversion, the first step of the thermal conversion temperature typically ranges from 800° C. to 1100° C. from one to four hours. In one embodiment, the temperature ranges from 850° C. to 950° C. in two hours. The second step of oxidation under the airflow at the temperature between 200° C. to 500° C. from 30 minutes to 2 hours, following the third step of reduction under ammonia at the temperature under the same range of temperature from 30 minutes to 2 hours. For TM oxide conversion, the thermal conversion temperature typically ranges from 150° C. to 800° C. In one embodiment, the temperature ranges from 200° C. to 450° C. The thermolysis time should also be controlled. The thermal treatment time should be in the range of 30 min to 9 hours. In one embodiment, the time under the treatment temperature should range from 1 hour to 6 hours. A carrier gas is utilized in the thermal treatment to define the environment. In one embodiment for the formation of TM carbonitride, the carrier gas in the first step should be inert gases, such as Ar, He, or $N_2$ at ambient pressure, the carrier gas for the second step should be oxidizing gas such as air, and the carrier gas for the third step should be reducing gas containing nitrogen for TM carbonitride formation such as ammonia. In yet another embodiment for oxide and perovskite formation, the carrier gas should be oxidative. Examples of such oxidizing carrier gas include, but not limited to, air, $O_2$, oxygen-inert gas mixture, $CO_2$, etc. These gases have different oxidative capability therefore affecting the rate of oxide formation.

The process of preparing electrospun PNCE electrocatalyst according to various embodiments described above can be further elucidated by the following non-limiting examples:

Sample Preparations

Example 1

The scheme of electrospin of MOF-containing nanofiber is shown by FIG. 1, which is consisted of several stages of preparation: Synthesis and electrospinning of a monometallic MOF-based PNCE catalyst. Stage a) synthesis of cobalt methylimidazolate zeolitic framework, $Co(mIm)_2$ (Co—ZIF, a subgroup of MOF): Typically, $Co(NO_3)_2.6H_2O$ (2.601 g, 10 mmol) was dissolved in methanol (50 ml) and a solution of 2-methylimidazole (1.642 g, 20 mmol) in methanol (50 ml) was added. The mixture was stirred at room temperature for 0.5 h and then was kept at room temperature for 12 h. The violet crystals were collected, and washed with methanol for 3 times, before being dried at 50° C. for 24 h. Stage b) electrospin slurry preparation. The MOF thus prepared (400 mg) was suspended in Dimethylformamide (DMF) (4 ml) followed by mechanical ball milling for 3 hours at 400 RPM. Meanwhile, PVP (0.5 g) was dissolved in ethanol (5 ml) followed by stirring at room temperature for 2 hours to form the viscous fluid. Thus obtained viscous fluid was mixed with MOF in DMF solution, and the mixture was ball milled for 0.5 hour at 400 RPM. The MOF-PVP-DMF mixture was subsequently subjected to electrospinning for fiber fabrication. Stage c) 0.8 ml MOF-PVP-DMF solution was loaded into syringe and was placed into the electrospinning machine to be spun into the nanofibers. The voltage applied to the machine was 10 kV, and the flow rate was set at 0.005 ml/min.

Example 2

Convert Fiber to OER Catalyst for Alkaline Electrolyzer.

The monometallic MOF-containing nanofibers prepared according to the procedure described in Example 1 was subjected to high temperature treatment. Generally, the nanofiber were loaded into a ceramic boat and pyrolyzed under Ar atmosphere in a tubular furnace at 1000° C.-1050° C. for 1 hour to form Co metal doped graphitized carbon nano fiber. Following the cooling of oven temperature to 300° C.~400° C., airflow was introduced for 0.5 h to allow Co converted to CoO. Finally, $NH_3$ flow will be introduced to replace airflow at the same temperature for 30-45 min to allow CoO converted to CoNx. A schematic diagram for such conversion is shown by FIG. 2, path 1.

Example 3

The monometallic MOF-containing nanofibers prepared according to the procedure described in Example 1 was pyrolyzed in a tubular furnace at 1000° C.-1050° C. under Ar atmosphere for 1 hour to form Co metal doped graphitized carbon nano fiber, as the temperature cooling to 950° C., purge $NH_3$ for 5 min. After the temperature was cooled to room temperature, the sample was further treated with acidic wash in a 0.5M $H_2SO_4$ solution to remove some of the excess cobalt metal between Ar and $NH_3$ treatments. The acidic washed sample was further pyrolyzed in a tube furnace at temperature between 200° C.~400° C. under flowing air for 1 h to allow Co converted to CoO, followed by $NH_3$ treatment at the same temperature for 1~2 h to allow CoO converted to CoNx.

Example 4

Synthesis of a monometallic MOF-based PNCE catalyst using the same procedure according to Example 1 except with different pyrolysis method. The electrospun nanofiber was first pyrolyzed in a tubular furnace at 750° C.-850° C. under Ar atmosphere for 1 hour to form Co metal doped graphitized carbon nano fiber. When the temperature was lowered to 400° C. during cooling process, the Ar flow was replaced by air for 0.5 h. As the temperature cooling to 300~360° C., $NH_3$ flow replaced air for 2~3 hours, and then wait until the temperature cooling down to room temperature.

Example 5

Convert Fiber to OER Catalyst for Acidic Electrolyzer.

Synthesis of a monometallic MOF-based PNCE catalyst using the same procedure for preparing nanofibers according to Example 1. The electrospun nanofiber was directly pyrolyzed under flowing Air in a tubular furnace at temperature of 380° C. for 8 h to form pure metal oxide without carbon. A schematic diagram for such conversion is shown by FIG. 2, path 2.

Example 6

Synthesis Bimetallic MOF-Containing PNCE Catalyst.

Stage a) synthesis of lanthanum doped cobalt methylimidazolate zeolitic framework, $La@Co(mlm)_2$: Typically, $Co(NO_3)_2 \cdot 6H_2O$ (2.601 g, 10 mmol), $La(NO_3)_3 \cdot xH_2O$ (1.299 g, 4 mmol) were dissolved in methanol (50 ml) and a solution of 2-methylimidazole (1.642 g, 20 mmol) in methanol (50 ml) was added. The mixture was stirred at the room temperature for 0.5 h and was kept at room temperature for 12 h. The violet crystals were collected, and washed with methanol for 3 times before being dried at 50° C. for 24 h. The following steps for electrospinning nanofiber are the same according to Stage b and Stage c of Example 1, and the thermolysis of air treatment is the same according to Example 5.

Example 7

Synthesis Trimetallic MOF-Containing PNCE Catalyst.

Synthesis of lanthanum and molybdenum co-doped cobalt methylimidazolate zeolitic framework, $LaMo@Co(mlm)_2$ using the same procedure as shown by Example 6 Stage a) except that the molybdenum(III) chloride was introduced and the molar ratio of Co/La/Mo was kept at 5:2:1. The following steps for electrospinning nanofiber were the same as shown by Example 1 Stage b and Stage c, and Example 5, heat treatment.

Example 8

Synthesis Trimetallic MOF-Containing PNCE Catalyst.

Synthesis of lanthanum and manganese co-doped cobalt methylimidazolate zeolitic framework $LaMn@Co(mlm)_2$ using the same procedure as shown by Example 7 except that manganese(II) carbonate was used in the place of molybdenum chloride and the molar ratio of Co/La/Mn was kept at 5:2:1. The following steps for electrospinning nanofiber were the same as shown by Example 1 Stage b and Stage c, and Example 5, heat treatment.

Example 9

Synthesis Trimetallic MOF-Containing PNCE Catalyst.

Synthesis of lanthanum and nickel co-doped cobalt methylimidazolate zeolitic framework $LaNi@Co(mlm)_2$ using the same procedure as shown by Example 7 except that the $Ni(NO_3)_2 \cdot 6H_2O$ was used in the place of molybdenum chloride and the molar ratio of Co/La/Ni was kept at 5:2:1. The following steps for electrospinning nanofiber were the same as shown by Example 1 Stage b and Stage c, and Example 5, heat treatment.

Example 10

Synthesis Trimetallic MOF-Containing PNCE Catalyst.

Synthesis of lanthanum and lithium co-doped cobalt methylimidazolate zeolitic framework $LaLi@Co(mlm)_2$ using the same procedure as shown by Example 7 except that the lithium carbonate was used in the place of molybdenum chloride and the molar ratio of Co/La/Li was kept at 5:2:1. The following steps for electrospinning nanofiber were the same as shown by Example 1 Stage b and Stage c, and Example 5, heat treatment.

Example 11

Synthesis Trimetallic MOF-Containing PNCE Catalyst.

Synthesis of lanthanum and iron co-doped cobalt methylimidazolate zeolitic framework $LaFe@Co(mlm)_2$ using the same procedure as shown by Example 7 except that the $Fe(NO_3)_3 \cdot 9H_2O$ was used in the place of molybdenum chloride and the molar ratio of Co/La/Fe was kept at 5:2:1. The following steps for electrospinning nanofiber were the same as shown by Example 1 Stage b and Stage c, and Example 5, heat treatment.

Example 12

Synthesis Trimetallic MOF-Containing PNCE Catalyst.

Synthesis of lanthanum and tungsten co-doped cobalt methylimidazolate zeolitic framework $LaW@Co(mlm)_2$ using the same procedure as shown by Example 7 except that the $WCl_4$ was used in the place of molybdenum chloride and the molar ratio of Co/La/W was kept at 5:2:1. The following steps for electrospinning nanofiber were the same as shown by Example 1 Stage b and Stage c, and Example 5, heat treatment.

Catalyst Testing

Example 13

The electrocatalytic activities of the OER catalysts for water splitting prepared according to Example 1 to Example 5 were tested using the rotating disk electrode (RDE) technique in an alkaline electrolyte. About 3 mg of each sample was put into a 5 ml vial to prepare a catalyst ink by mixing 0.05% Nafion solution and methanol as the solvent. The prepared inks were sonicated for at least 2 hours and then magnetic stirred over night until they became smooth and easy to deposit on to a glassy carbon (GC) electrode. Each ink was applied onto the GC using a micropipette, targeting a loading equivalent to 200 μg/cm² of the dry sample. The catalyst inks were tested using the 0.1M KOH aqueous solution as the electrolyte with Hg/HgO with saturated $K_2SO_4$ solution as reference electrode and a gold counter electrode. The electrolyte was saturated with oxygen gas for at least 30 min before voltammogram were recorded.

Figure 3:
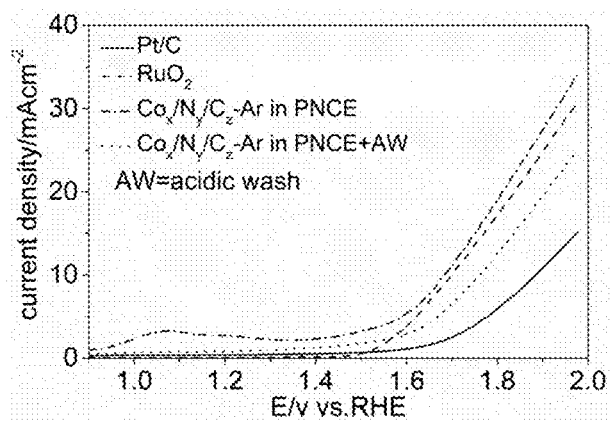
FIG. 3 shows a side-by-side comparison of OER current densities of two $Co_x/N_y/C_z$ catalysts vs. $RuO_2$ powder and Pt/C measured by RDE. Electrolyte is 0.1M KOH solution saturated by purged $O_2$.
Figure 4:
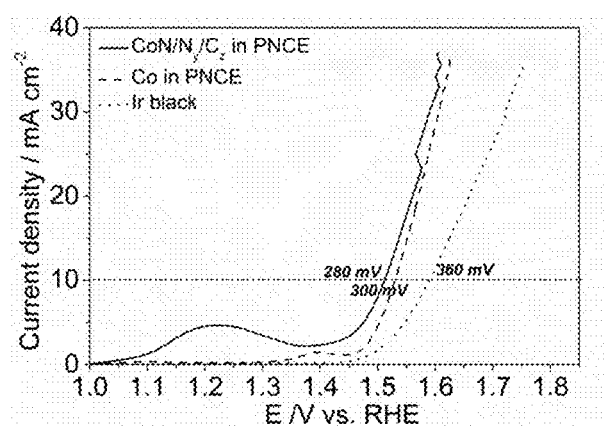
FIG. 4 shows a side-by-side comparison of OER current densities of $CoN/N_y/C_z$ catalyst and Co in PNCE vs. Ir black measured by RDE in $O_2$ saturated 0.1M KOH electrolyte.

The Co$_x$/N$_y$/C$_z$ catalysts with PNCE morphology prepared according to Example 2 was named as Co$_x$/N$_y$/C$_z$—Ar in PNCE while the catalyst according to Example 3 is named as Co$_x$/N$_y$/C$_z$—Ar in PNCE+AW, and catalysts prepared according to Example 4 was named as CoN/N$_y$/C$_z$ in PNCE, and catalysts prepared according to Example 5 was named as Co in PNCE. All catalysts were tested by RDE, together with three benchmark catalysts, RuO$_2$, Ir black and Pt/C, respectively. FIG. 3 shows the side-by-side comparison of OER current density as function of linear sweep potential for all four catalysts in O$_2$ saturated 0.1M KOH electrolyte. The performance of Co$_x$/N$_y$/C$_z$ matched closely to that of RuO$_2$, and was significantly higher than that of Pt/C. After acidic wash, the performance of Co$_x$/N$_y$/C$_z$—Ar in PNCE+AW was still higher than that of Pt/C. FIG. 4 shows the comparison of OER activities for CoN/N$_y$/C$_z$ in PNCE, Co in PNCE, and benchmarked to Ir black. The performance of both CoN/N$_y$/C$_z$ in PNCE and Co in PNCE are significantly higher than that of the commercial OER catalyst—Ir black.

Example 14

The electrocatalytic activities of the OER catalysts for water splitting prepared according to Example 6 to Example 12 were tested using the RDE technique in an acidic electrolyte. The ink preparations for the RDE test are the same as shown in Example 14. The catalyst inks were tested using the 0.1 M HClO$_4$ or 0.5 M H$_2$SO$_4$ aqueous solution as the electrolyte, Hg/Hg$_2$SO$_4$ with a saturated K$_2$SO$_4$ solution as reference electrode and a gold counter electrode. The electrolyte was saturated with oxygen gas for at least 30 min before voltammogram were recorded. Catalysts prepared according to Example 6 to Example 12 were named as Co in PNCE, La@Co in PNCE, LaM@Co in PNCE (M=Mo, Mn, Ni, Li, Fe, W).

Figure 5:
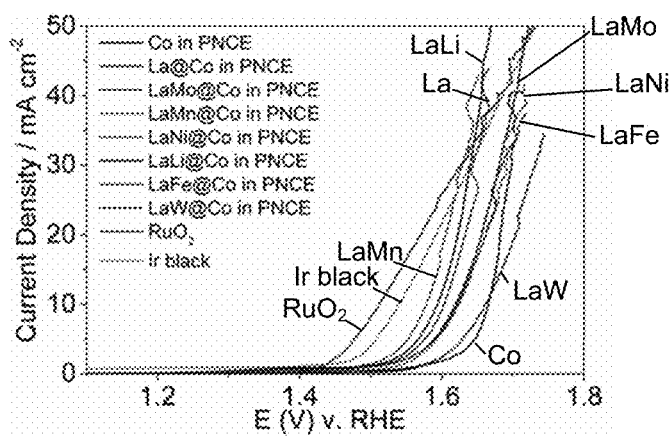
FIG. 5 shows a side-by-side comparison of OER current densities of Co in PNCE and metal doped Co in PNCE catalysts vs. $RuO_2$ powder and Ir black measured by RDE in $O_2$ saturated 0.1M $HClO_4$ electrolyte.

FIG. 5 shows the OER activities of the catalysts prepared according to Examples 6-12 in the form of current density—potential polarization in O$_2$ saturated 0.1M HClO$_4$ electrolyte. The Co in PNCE catalyst shows excellent OER catalytic activity. The bimetal Co MOF derived PNCE catalysts showed improved OER catalytic activities. Especially, the performance of LaMn@Co in PNCE catalyst is much close to that of Ir black. The over potential of LaMn@Co catalyst at 10 mA cm$^{-2}$ current is only 40 mV higher than that of Ir.

Example 15

Figure 6:
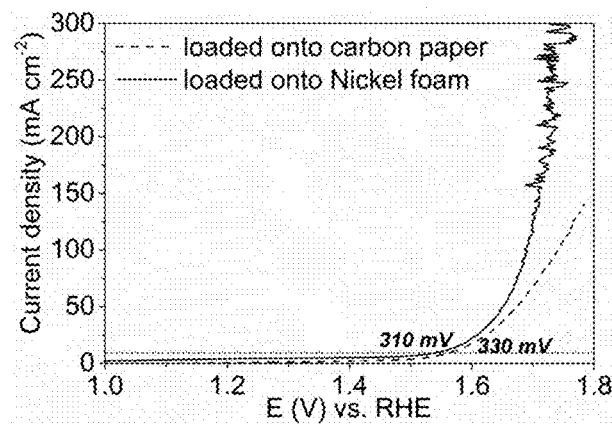
FIG. 6 shows a side-by-side comparison of OER current densities of metal doped Co in PNCE catalysts loaded over carbon paper and nickel foam in $O_2$ saturated 0.1M $HClO_4$ electrolyte. The numbers in the figure represents the overpotential of OER reaction measured at 10 mA/cm$^2$ against the theoretical potential of 1.23 V.

The electrocatalytic activity of the LaMn@Co in PNCE OER catalyst for water splitting was also tested by loading the catalyst onto carbon paper and nickel foam, respectively, in O$_2$ saturated 0.1M HClO$_4$ electrolyte. FIG. 6 shows the improved activity in term of the reduced overpotential at 10 mA cm$^{-2}$ current density and the increased current density at high potential.

Example 16

Figure 7:
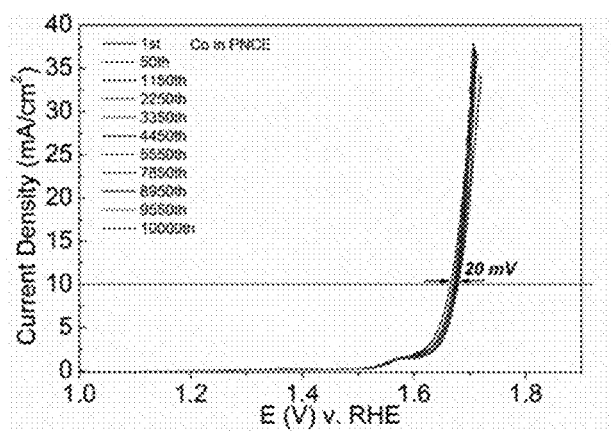
FIG. 7 shows current-voltage polarizations curves measured by rotating disk electrode (RDE) method for catalyst prepared according to Example 6 at several stages after multiple voltage cycles during an accelerated stress test. The test condition was performed in $O_2$ saturated 0.1M $HClO_4$ electrolyte.

The monometallic MOF-derived OER catalyst prepared according to Example 6 was subjected to a durability test using RDE in O$_2$ saturated 0.1 M HClO$_4$ electrolyte. In this test, the potential was polarized using cyclic voltammetry scan from 1.2-1.7V repeatedly in a multiple voltage cycling stress test. After 50, 100, 300, 600, 10,000 voltage cycles, the current-voltage polarization from 1.1V-2.0V was performed. FIG. 7 shows that only 0.02V voltage increase at the current density of 10 mA cm$^{-2}$ was observed between the first cycle and the 10,000$^{th}$ cycle, corroborating a relatively stable catalyst performance.

Example 17

Figure 8:
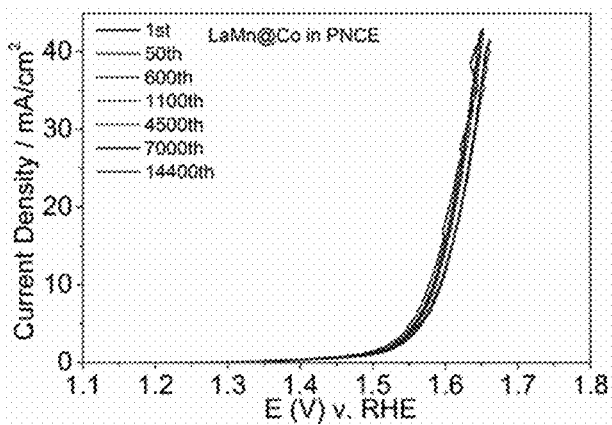
FIG. 8 shows current-voltage polarizations curves measured by RDE method for catalyst prepared according to Example 9 at several stages after multiple voltage cycles during an accelerated stress test. The test condition was performed in $O_2$ saturated 0.1 $MHClO_4$ electrolyte.

The trimetallic MOF-derived OER catalyst prepared according to Example 8 was also subjected to the same durability test as described by Example 17 except more voltage cycling was added. After 50, 600, 1100, 4000, 7500, 14400 voltage cycles, the current-voltage polarization from 1.1V-2.0V was performed. FIG. 8 shows that only 0.02V voltage drop at the current density of 10 mA cm$^{-2}$ was observed between the first cycle and the 14400$^{th}$ cycle, corroborating a relatively stable catalyst performance.

Example 18

Figure 9:
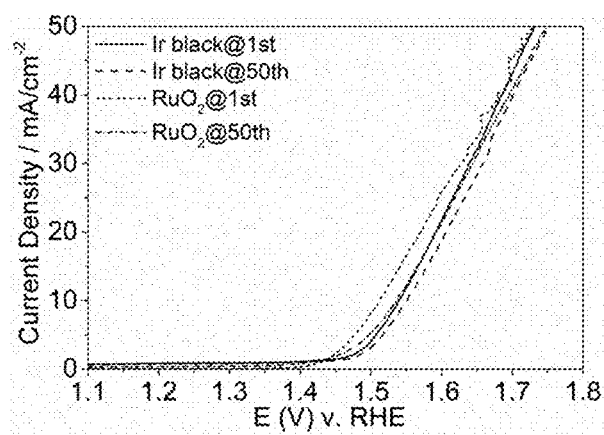
FIG. 9 shows current-voltage polarizations curves measured by RDE method for conventional OER catalysts at several stages after multiple voltage cycles during an accelerated stress test. The test condition was performed in $O_2$ saturated 0.1M $HClO_4$ electrolyte.

The conventional Ru and Ir based precious metal catalysts were also subjected to the same durability test as described by Example 17. FIG. 9 shows that significant voltage drops were observed between the 1$^{st}$ cycle and the 50$^{th}$ cycle, indicating that the conventional catalysts are less stable than those of the MOF-nanofiber derived catalysts which were demonstrated in Example 16 and 17.

Example 19

The morphology of the carbonaceous PNCE catalyst prepared according to the Example 2~4 was investigated by the scanning electron microscopy (SEM). FIG. 10 shows the interconnected porous nanofibrous network of one of the PNCEs. FIG. 11 shows the interconnected porous CoN/N$_y$/C$_z$ particles with the shape similar to that of MOF precursor in the nanofibrous network.

Example 20

Figure 12:
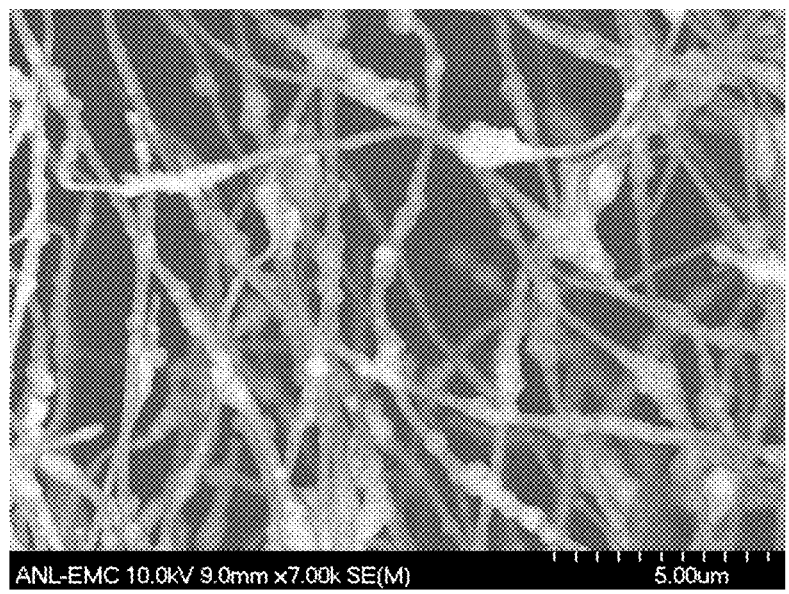
FIG. 12 shows the morphology of the PNCE catalyst prepared according to Example 9 before the thermal activation step.

The morphology of the oxide PNCE catalyst prepared according to the Example 6 and 9 was also investigated by the SEM and TEM. FIG. 12 shows the interconnected MOF-containing nanofibrous network of the PNCE before thermal activation; FIG. 13 shows the morphology of the oxidized PNCE after activation in air; and FIG. 14 shows the TEM image of the oxidized PNCE after activation in air. The particle maintains the MOF morphology and are connected by oxide fibers in between. Inside of the MOF-liked structure contains fine metal oxide particles with size of ~3 nm. The energy dispersive X-ray spectroscopy (EDX) analysis (not shown) indicated that both the metal oxide particles and connecting metal oxide fibers contain a trace amount of atomically dispersed carbon (~5%).

Example 21

Figure 15:
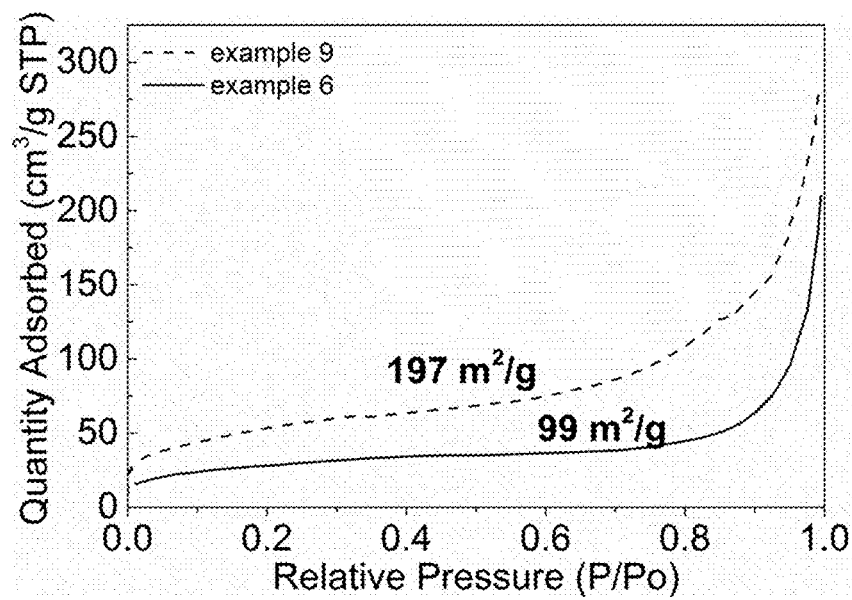
FIG. 15 shows nitrogen adsorption isotherms measured at 77K using BET method for the catalyst samples prepared according to Example 6 and Example 9.
Figure 16:
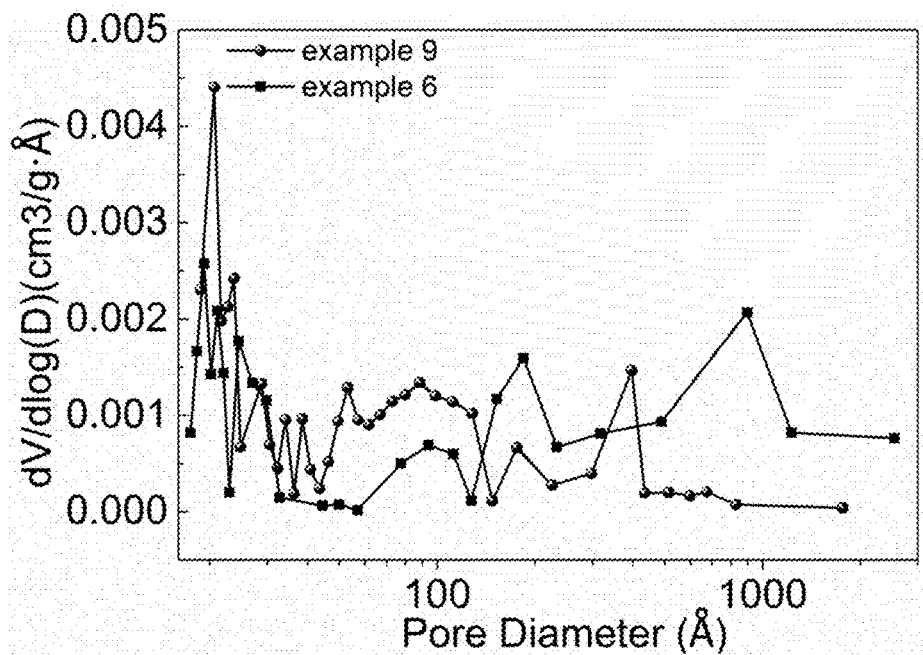
FIG. 16 shows pore size distributions calculated using non-linear DFT method over the nitrogen isotherm measurements for catalyst samples prepared according to Example 6 and Example 9. The average micropore diameters for catalysts from the Example 6 and Example 9 are 13 nm and 9 nm, respectively.

The specific surface areas of the PNCE catalysts prepared according to Example 6 and Example 9 were also measured by BET method at the liquid nitrogen temperature. FIG. 15 shows Nitrogen adsorption isotherms measured at 77 K using BET method for the catalyst samples prepared according to Example 6 and Example 9. FIG. 16 shows the pore size distributions calculated using non-linear DFT method over the nitrogen isotherm measurements for catalyst samples prepared according to Example 6 and Example 9. The average micropore diameters for catalysts from the Example 6 and Example 9 are 13 nm and 9 nm, respectively.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
    preparing a metal organic framework material comprising MOF crystals forming a mixture of MOF crystals suspended in a polymer solution, the MOF crystals being bimetallic or trimetallic;
    electrospinning the MOF crystals and polymer mixture, forming porous and interconnected nanofibers having MOF crystals uniformly dispersed; and
    subjecting the metal organic framework containing porous nanofiber to sequential thermolysis, forming catalytic nanofibers with uniformly distributed catalytic sites;
    wherein the catalytic nanofibers are catalytic for the oxygen evolution reaction for water splitting in either alkaline or acidic aqueous media.

2. The method of claim 1, wherein the polymer solution comprises a polymer selected from the group consisting of polyacrylonitrile (PAN), poly(methylmethacrylate) (PMMA), polyvinylpyrrolidone (PVP), nylon6,6 (PA-6,6), polyurethanes (PU), polybenzimidazole (PBI), polycarbonate (PC), polyethylene-co-vinyl acetate (PEVA), collagen (PEO), polyacrylic acid-polypyrene methanol (PAA-PM), and polymethacrylate (PMA).

3. The method of claim 2, wherein concentration of the MOF crystals suspended in the polymer solution is from 0.1 mg/ml to 0.6 mg/ml.

4. The method of claim 3, wherein concentration of the MOF crystals suspended in the polymer solution is from 0.4 mg/ml to 0.6 mg/ml.

5. The method of claim 3, wherein concentration of the MOF crystals suspended in the polymer solution is from 0.1 mg/ml to 0.3 mg/ml.

6. The method of claim 1, wherein the metal organic framework comprises a transition metal selected from the group consisting of Co, Fe, Mn, Mo, Li, Nb, Ta, Zr, and Y.

7. The method of claim 6, wherein forming catalytic nanofibers comprises forming the uniformly distributed catalytic sites to include the transitional transition metal.

8. The method of claim 1, wherein forming the catalytic nanofibers comprises forming transition metal interconnected structures extending between the uniformly distributed catalytic sites.

9. The method of claim 1, wherein the thermolysis comprises a first thermal conversion under inert environment at a first temperature between 750° C. to 1100° C. for a first period of time between one to four hours, then a second thermal conversion under oxidizing environment at a second temperature between 200° C. to 500° C. for a period of 30 minutes to 2 hours, then a third thermal conversion under a reducing environment at a third temperature between 200° C. and 500° C. for a third period of 30 minutes to 2 hours, wherein the catalytic nanofibers are catalytic for oxygen evolution reaction in alkaline media.

10. The method of claim 1, wherein the thermolysis comprises a first thermal conversion at a temperature between 250° C. and 500° C. under an oxidizing environment for a first period of time of 30 minutes to 10 hours, wherein the catalytic nanofibers are catalytic for oxygen evolution reaction in acidic media.

11. A method comprising:
    preparing a metal organic framework material comprising MOF crystals forming a mixture of MOF crystals suspended in a polymer solution;
    electrospinning the MOF crystals and polymer mixture, forming porous and interconnected nanofibers having MOF crystals uniformly dispersed; and
    subjecting the metal organic framework containing porous nanofiber to sequential thermolysis, forming catalytic nanofibers with uniformly distributed catalytic sites;

wherein the thermolysis comprises:
a first thermal conversion under inert environment at a first temperature between 750° C. to 1100° C. for a first period of time between one to four hours,
then a second thermal conversion under oxidizing environment at a second temperature between 200° C. to 500° C. for a period of 30 minutes to 2 hours, and
then a third thermal conversion under a reducing environment at a third temperature between 200° C. and 500° C. for a third period of 30 minutes to 2 hours,
wherein the catalytic nanofibers are catalytic for oxygen evolution reaction in alkaline media, and
wherein the catalytic nanofibers are catalytic for the oxygen evolution reaction for water splitting in either alkaline or acidic aqueous media.

12. A method comprising:
preparing a metal organic framework material comprising MOF crystals forming a mixture of MOF crystals suspended in a polymer solution;
electrospinning the MOF crystals and polymer mixture, forming porous and interconnected nanofibers having MOF crystals uniformly dispersed; and
subjecting the metal organic framework containing porous nanofiber to sequential thermolysis, forming catalytic nanofibers with uniformly distributed catalytic sites;
wherein the thermolysis comprises a first thermal conversion at a temperature between 250° C. and 500° C. under an oxidizing environment for a first period of time of 30 minutes to 10 hours, wherein the catalytic nanofibers are catalytic for oxygen evolution reaction in acidic media, and
wherein the catalytic nanofibers are catalytic for the oxygen evolution reaction for water splitting in either alkaline or acidic aqueous media.

* * * * *